United States Patent
Liu et al.

(10) Patent No.: US 11,539,521 B2
(45) Date of Patent: Dec. 27, 2022

(54) CONTEXT BASED SECURE COMMUNICATION

(71) Applicant: International Business Machines Corporation, Armonk, NY (US)

(72) Inventors: Su Liu, Austin, TX (US); Yin Xia, Beijing (CN); Cheng Xu, Beijing (CN); Xinya Wang, Austin, TX (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 58 days.

(21) Appl. No.: 17/122,011

(22) Filed: Dec. 15, 2020

(65) Prior Publication Data

US 2022/0191024 A1 Jun. 16, 2022

(51) Int. Cl.
*H04L 9/32* (2006.01)
*H04L 9/40* (2022.01)

(52) U.S. Cl.
CPC ............ *H04L 9/32* (2013.01); *H04L 63/0428* (2013.01)

(58) Field of Classification Search
CPC .............................. H04L 9/32; H04L 63/0428
USPC ......................................................... 713/168
See application file for complete search history.

(56) References Cited

U.S. PATENT DOCUMENTS

| | | | |
|---|---|---|---|
| 5,161,189 A | 11/1992 | Bray et al. | |
| 7,076,784 B1 | 7/2006 | Russell et al. | |
| 7,171,478 B2 | 1/2007 | Lueckhoff et al. | |
| 8,473,925 B2 | 6/2013 | Gagliardi et al. | |
| 8,762,957 B2 | 6/2014 | Cobb et al. | |
| 9,536,098 B2* | 1/2017 | Jadeja ................. | H04L 63/0428 |
| 9,626,667 B2* | 4/2017 | Boccon-Gibod ....... | G06F 21/10 |
| 2004/0078567 A1* | 4/2004 | Newbould ............ | H04L 9/3247 713/176 |
| 2006/0224424 A1* | 10/2006 | Khusial ................. | G06Q 10/00 709/217 |
| 2008/0168423 A1* | 7/2008 | Daskal .................. | G06Q 10/10 717/120 |
| 2009/0144836 A1* | 6/2009 | Gutta ................... | H04L 63/0861 726/30 |
| 2010/0223446 A1* | 9/2010 | Katariya ............. | G06F 11/3476 712/E9.032 |
| 2011/0167156 A1* | 7/2011 | Mani ..................... | H04L 67/125 709/224 |
| 2016/0321343 A1* | 11/2016 | Hughes .............. | G06Q 10/0833 |
| 2019/0260764 A1* | 8/2019 | Humphrey ............. | H04L 63/14 |
| 2021/0044573 A1* | 2/2021 | Chauhan ............. | H04L 63/0428 |

FOREIGN PATENT DOCUMENTS

| | | |
|---|---|---|
| EP | 1243999 B1 | 3/2013 |
| JP | 5723207 B2 | 5/2015 |
| WO | 2004100439 A1 | 11/2004 |

* cited by examiner

*Primary Examiner* — Amare F Tabor
(74) *Attorney, Agent, or Firm* — Garg Law Firm, PLLC; Rakesh Garg; Nathan Rau

(57) ABSTRACT

By analyzing a content of a first message, a confidentiality level of the first message is determined. An encryption rule for a first computational complexity level corresponding to the confidentiality level of the first message is selected. The first message is encoded according to the encryption rule. The encoded first message and the confidentiality level of the first message are caused to be sent to a recipient.

18 Claims, 12 Drawing Sheets

US 11,539,521 B2

CONTEXT BASED SECURE COMMUNICATION

BACKGROUND

The present invention relates generally to a method, system, and computer program product for secure communication. More particularly, the present invention relates to a method, system, and computer program product for context based secure communication.

A messaging service transmits communications, or messages, from a sender to a receiver over a communications network. Thus, a message is a communication between a sender and a receiver over a messaging service. A message can be formatted as a Short Message Service (SMS) text message, a Multimedia Messaging Service (MMS) message including text and another form of media, a text, audio, video, static image, or other medium. A message can be inputted and viewed using an application or website.

Some messaging services use the Internet as their communications network, while others use a telephone network to communicate between telephones, and others use a combination of different types of communications network. Some messaging services offer real-time communications, others offer non-real-time communications such as electronic mail and postings to discussion groups or forums, and some messaging services offer a combination of communication services.

An interaction includes a set of messages between a common set of parties. An interaction need not be limited to two parties.

SUMMARY

The illustrative embodiments provide a method, system, and computer program product. An embodiment includes a method that determines, by analyzing a content of a first message, a confidentiality level of the first message. An embodiment selects, for a first computational complexity level corresponding to the confidentiality level of the first message, an encryption rule. An embodiment encodes, according to the encryption rule, the first message, the encoding generating an encoded first message. An embodiment causes sending, to a recipient, the encoded first message and the confidentiality level of the first message.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
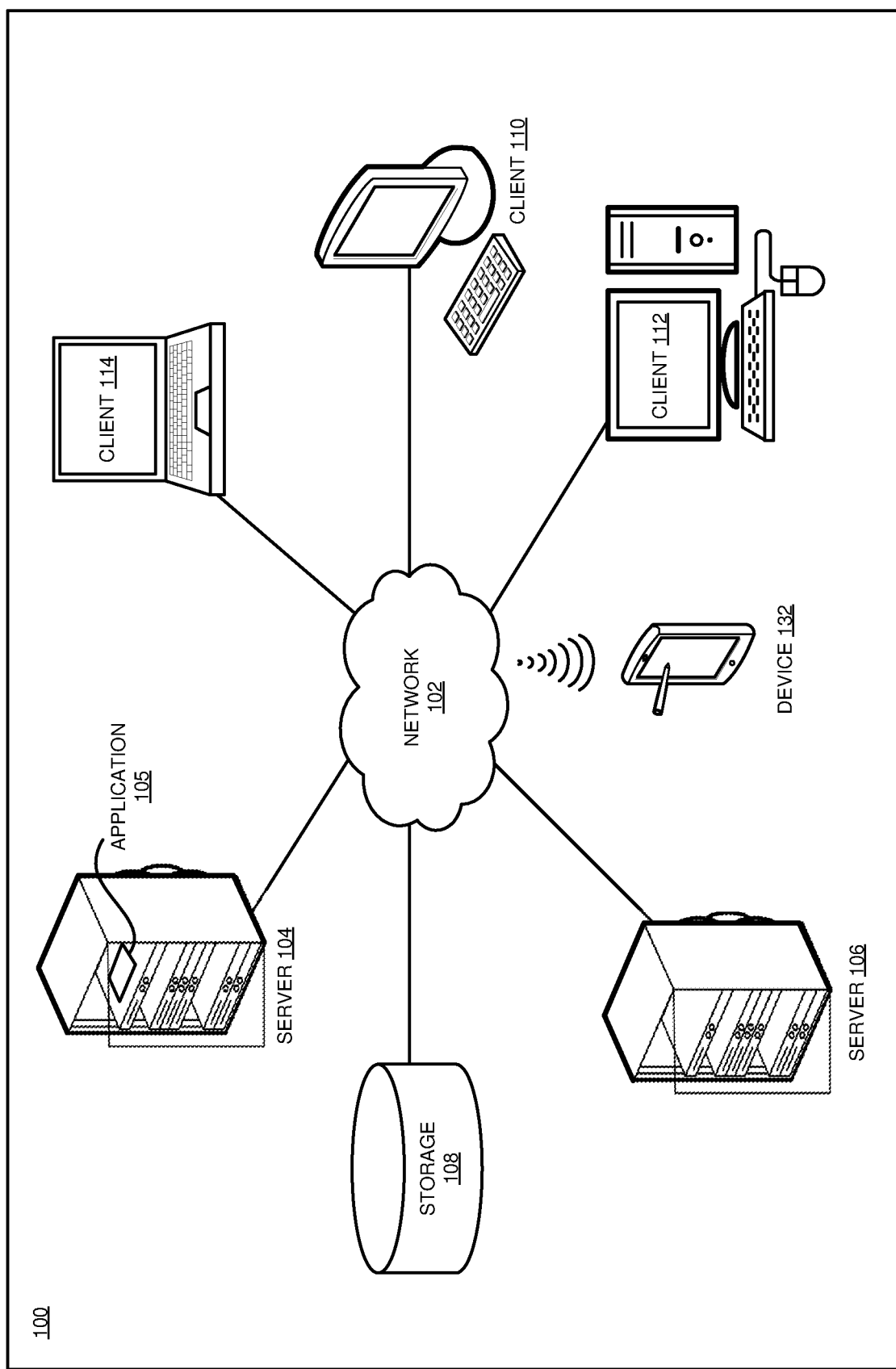
FIG. 1 depicts a block diagram of a network of data processing systems in which illustrative embodiments may be implemented.

The illustrative embodiments recognize that messages communicated over a messaging service often include confidential information such as a person's home address, credit card number, or other financial or health information. Such information must be protected from unauthorized disclosure while in transit and in storage at a messaging service.

The illustrative embodiments also recognize that conventional message protections include various forms of cryptography, including encryption and decryption using public and private keys, digital signature technology, and the like. However, if a private key is exposed, messages encrypted using the private key are also exposed. In addition, more computing power becomes available every year, and as computing power available to break cryptography increases, the cryptography itself must be made stronger to resist such attacks. Consequently, the illustrative embodiments recognize that there is an unmet need for a different message protection method that is not as vulnerable to attacks using increasing computing power and is not based on a single key that could exposed many messages.

The illustrative embodiments recognize that the presently available tools or solutions do not address these needs or provide adequate solutions for these needs. The illustrative embodiments used to describe the invention generally address and solve the above-described problems and other problems related to context based secure communication.

An embodiment can be implemented as a software application. The application implementing an embodiment can be configured as a modification of an existing message communication system, as a separate application that operates in conjunction with an existing message communication system, a standalone application, or some combination thereof.

Particularly, some illustrative embodiments provide a method that analyzes a content of a message to determine a confidentiality level of the message, selects an encryption rule for a computational complexity level corresponding to the confidentiality level, encodes the message according to the encryption rule, and sends the encoded message to a recipient.

An embodiment analyzes content of a message to determine a confidentiality level of the message. One embodiment analyzes textual content of a message using one or more text classification, keyword extraction, concept extraction, and contextual interpreter techniques, all of which are presently available, to identify keywords and concepts contained in a textual content of a message, or non-textual content of a message converted (using a presently available technique) to text form. Text classification is the process of assigning tags or categories to a portion of text according to the portion's content. Keyword extraction is a text analysis technique that extracts the most used and most important words and expressions from a portion of text. Concept extraction generalizes keyword extraction to determine, not just particular words, but concepts expressed in a portion of text. Contextual interpretation analyzes the words around a keyword (i.e. the context of a keyword) to refine and confirm the results of keyword and concept extraction techniques. Some implementations of text classification, keyword extraction, concept extraction, and contextual interpreter techniques use one or more trained natural language processing models to perform each technique. Based on the results of one or more text classification, keyword extraction, concept extraction, and contextual interpreter techniques, the embodiment classifies a message into one or more of a set of predetermined categories. In addition, other embodiments use other presently available techniques to categorize both textual and non-textual message content. For example, techniques are presently available to analyze and categorize non-textual message content such as audio, video, and emojis.

An embodiment selects a confidentiality level of a message based on the message's category. For example, consider a message classified into a financial information category because it includes the phrase "my credit card number is 123 456 789". Because exposure of financial information to unauthorized entities could result in a monetary loss, an embodiment might select a confidentiality level for the message of 4, on a 1-4 scale with 4 being the highest level, for this message. As another example, consider a message classified into a protected health information category because it includes information about a patient's upcoming doctor's appointment. Because, in a relevant jurisdiction, the appointment information is considered protected health information that is not to be disclosed to unauthorized entities, an embodiment might select a confidentiality level for the message of 3 on the same 1-4 scale. As another example, consider a message classified into a personally identifiable information category because it includes personally identifiable information, such as a person's home telephone number or address. Because a message handling system is configured to protect personally identifiable information from disclosure, an embodiment might select a confidentiality level for the message of 2 on the same 1-4 scale. As a fourth example, if a message is classified into a general category that does not require protection, an embodiment might select a confidentiality level for the message of 1 on the same 1-4 scale. Other message categories, other confidentiality levels and confidentiality level scales, and other correspondences between message categories and confidentiality levels are also possible and contemplated within the scope of the illustrative embodiments.

An embodiment selects a computational complexity level corresponding to a confidentiality level for the message. A computational complexity level represents an estimated computational complexity necessary to decode a message encoded with an encryption rule of the selected computational complexity level. Thus, a message that is considered to require relatively higher protection—i.e., having a higher confidentiality level—should be encoded with an encryption rule requiring corresponding higher computational complexity to break the encoding. Similarly, a message that is considered to require relatively lower protection—i.e., having a lower confidentiality level—should be encoded with an encryption rule requiring lower computational complexity to break this encoding. As a result, a computationally complex encryption rule need not be applied to a message containing content that is already public, and computing resources used for encoding are applied only to messages requiring more complex encoding. In one embodiment, a message's confidentiality level is the same as the message's computational complexity level. In another embodiment, a message's confidentiality level is proportional to the message's computational complexity level. One embodiment stores mappings between confidentiality level and corresponding computational complexity level in a mapping table, and shares a portion of or the entire mapping table with another embodiment executing in another system with which encoded messages are intended to be communicated.

An embodiment selects an encryption rule of the selected computational complexity level based on a property of the message. An encryption rule specifies a computation to be made on a portion of a message to generate an encoded message. For example, a message byte and a corresponding mask value might be compared and an even or odd parity bit generated from the comparison. When using even parity, a resulting bit is set to 0 if there are an even number of is in corresponding inputs, and the resulting bit is set to 1 if there are an odd number of is in corresponding inputs. When using odd parity, a resulting bit is set to 0 if there are an odd number of is in corresponding inputs, and the resulting bit is set to 1 if there are an even number of is in corresponding inputs. In other words, even parity implements an exclusive-or operation and odd parity implements an exclusive-nor operation. Thus, when implementing a mask-value-based encryption rule, the rule specifies the mask value or source of the mask value, the message portion to be encoded using each mask value (e.g. a byte or a word), and the computation to be made using the mask value and message portion. In some embodiments, one or more of the encryption rules available for selection are configurable.

Some non-limiting examples of message properties used in encryption rule selection are a length, timestamp, type, sender and receiver of a message, a message's place within a message sequence, and properties of one or more previous messages in a message sequence. One embodiment selects one or more message properties used in encryption rule selection based on the message's computational complexity level. For example, the message's computational complexity level might be used to select how many previous messages in a message sequence, and which previous message or portion of a previous message should be used to encode the current message. In another example encryption rule, the first byte of the last three textual words in the immediate previous message would be used. In other examples, the message's computational complexity level might be used to select how many and which message properties would be used, how varying message lengths are accommodated (e.g. by repeating a portion of a message or with pseudorandom data), and whether or not pseudorandom data or a data salt would be used for message encoding.

One non-limiting example of a set of encryption rules based on the message's computational complexity level might include, for a computational complexity of 1, an encryption rule specifying using the most previous message in a message sequence to encode the current message. For a computational complexity of 2, an encryption rule might specify using the previous first, third, and fourth messages. For a computational complexity of 3, an encryption rule might specify using the first character of each textual word in the previous second and fifth messages. For a computational complexity of 4, an encryption rule might specify using the second character of the last three textual words in the previous message and the first character of each textual word in the previous third and fifth messages. Another non-limiting example of a set of encryption rules based on the message's computational complexity level might include multiple rules applicable to each computational complexity level, with a particular rule chosen based on a property of a current or past message.

To use encryption rules based on one or more previous messages in a message sequence when no applicable message sequence exists, an embodiment generates a genesis key with which to encode a message. One embodiment generates a genesis key using information known to both the message sender and receiver, such as a default date and time, locations, name, job or previous message exchange, using an algorithm also known to both parties. In another embodiment, one of the message sender and receiver, or a third party, generates a genesis key and communicates the key to the other parties. In another embodiment, the key is encrypted before communication to the other parties.

An embodiment shares the set of encryption rules, one or more algorithms used to select an encryption rule, a salt used to generate pseudorandom data if used in a particular encryption rule, a genesis key or algorithm used to generate a genesis key, and other data used in message encoding and decoding with another embodiment executing in another system with which encoded messages are intended to be communicated. As a result, the receiving embodiment has the necessary data with which to decode a received encoded message.

An embodiment uses a selected encryption rule to encode the message, then sends, or causes to be sent, a message encoded according to an encryption rule, and the confidentiality level of the encoded message, to a receiver. At the receiving system, a receiving embodiment selects a decryption rule for the encoded message according to the received confidentiality level and decodes the received message according to the decryption rule. Because the receiving embodiment already has any previous message in a message sequence from the sender, as well as the mapping table between confidentiality level and corresponding computational complexity level, the set of encryption rules, one or more algorithms used to select an encryption rule, a salt used to generate pseudorandom data if used in a particular encryption rule, a genesis key or algorithm used to generate a genesis key, and other data used in message encoding and decoding, the receiving embodiment has the data necessary to perform the decoding. In addition, unauthorized parties are unlikely to have the necessary data, increasing the computational complexity of decrypting the encoded message.

The manner of context based secure communication described herein is unavailable in the presently available methods in the technological field of endeavor pertaining to message communications. A method of an embodiment described herein, when implemented to execute on a device or data processing system, comprises substantial advancement of the functionality of that device or data processing system in analyzing a content of a message to determine a confidentiality level of the message, selecting an encryption rule for a computational complexity level corresponding to the confidentiality level, encoding the message according to the encryption rule, and sending the encoded message to a recipient.

The illustrative embodiments are described with respect to certain types of message contents, message properties, encoding and decryption rules and computations, computational complexities, confidentialities, keys, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
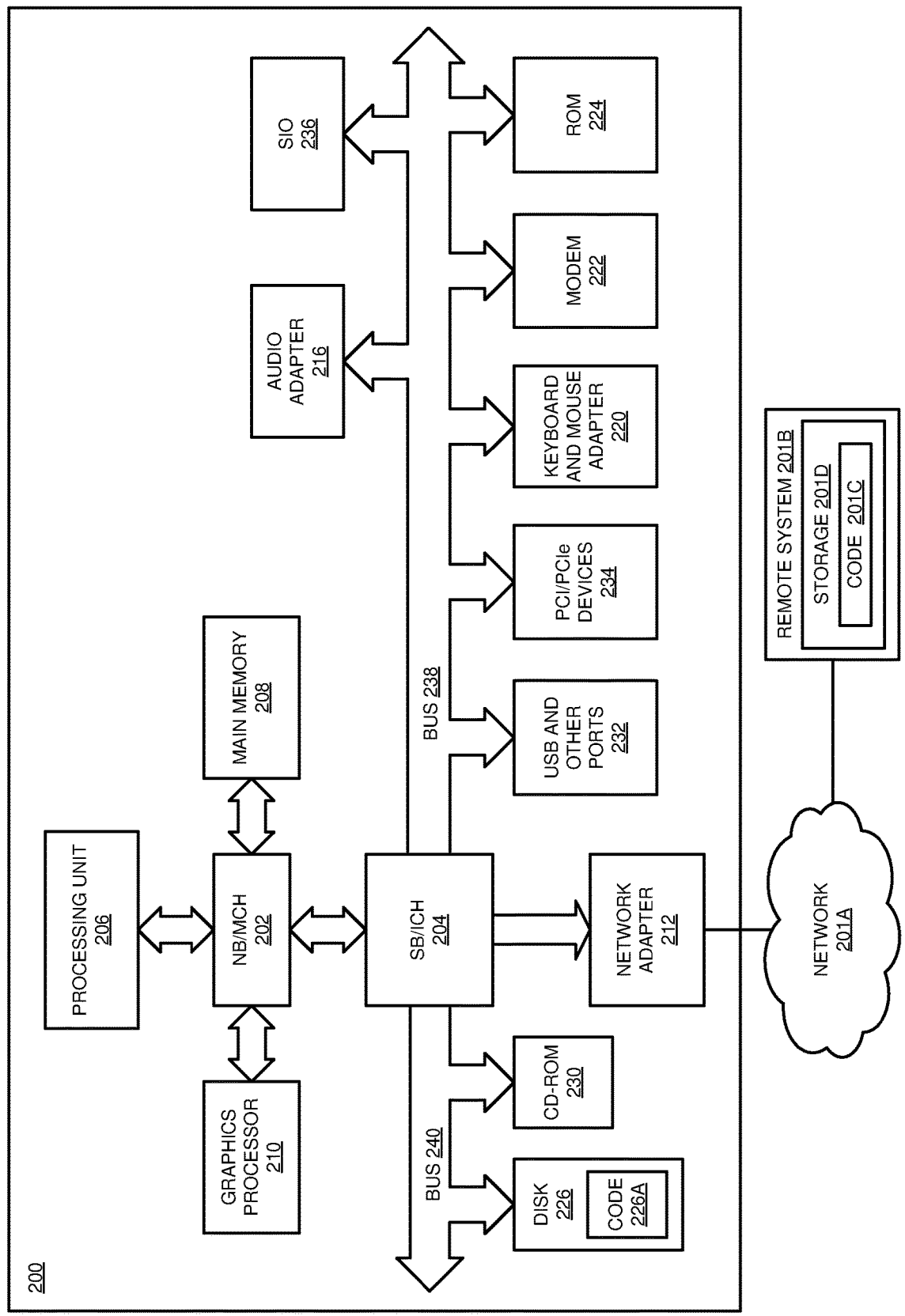
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 executes in any of servers 104 and 106, clients 110, 112, and 114, and device 132.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. In another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
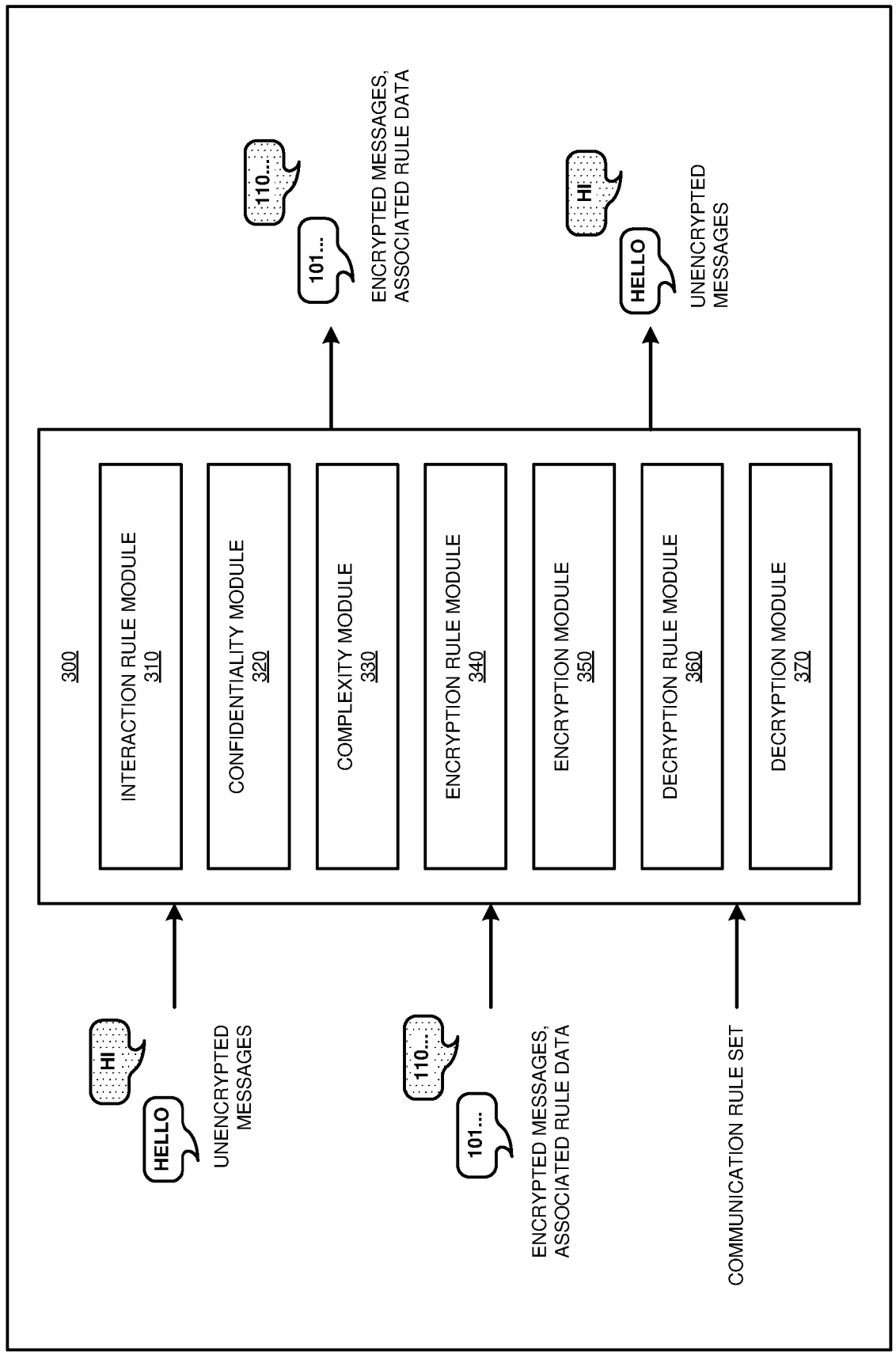
FIG. 3 depicts a block diagram of an example configuration for context based secure communication in accordance with an illustrative embodiment.

With reference to FIG. 3, this figure depicts a block diagram of an example configuration for context based secure communication in accordance with an illustrative embodiment. Application 300 is an example of application 105 in FIG. 1 and executes in any of servers 104 and 106, clients 110, 112, and 114, and device 132 in FIG. 1.

Interaction rule module 310 stores mappings between confidentiality level and corresponding computational complexity level in a mapping table, and shares a portion of or the entire mapping table with another instance of application 300 executing in another system with which encoded messages are intended to be communicated.

Interaction rule module 310 also generates a genesis key with which to encode a message when no applicable message sequence already exists. One implementation of module 310 generates a genesis key using information known to both the message sender and receiver, such as a default date and time, locations, name, job or previous message exchange, using an algorithm also known to both parties. In another implementation of module 310, one of the message sender and receiver, or a third party, generates a genesis key and communicates the key to the other parties. In another embodiment, the key is encrypted before communication to the other parties.

Module 310 shares the set of encryption rules, one or more algorithms used to select an encryption rule, a salt used to generate pseudorandom data if used in a particular encryption rule, a genesis key or algorithm used to generate a genesis key, and other data used in message encoding and decoding with another embodiment executing in another system with which encoded messages are intended to be communicated. As a result, the receiving embodiment has the necessary data with which to decode a received encoded message.

Confidentiality module 320 analyzes content of a message to determine a confidentiality level of the message. One implementation of module 320 analyzes textual content of a message using one or more text classification, keyword extraction, concept extraction, and contextual interpreter techniques, all of which are presently available, to identify keywords and concepts contained in a message. Based on the results of one or more analysis techniques, the embodiment classifies a message into one or more of a set of predetermined categories. In addition, other embodiments use other presently available techniques to categorize both textual and non-textual message content. Confidentiality module 320 selects a confidentiality level of a message based on the message's category.

Complexity module 330 selects a computational complexity level corresponding to a confidentiality level for the message. In one implementation of module 330, a message's confidentiality level is the same as the message's computational complexity level. In another implementation of module 330, a message's confidentiality level is proportional to the message's computational complexity level.

Encryption rule module 340 selects an encryption rule of the selected computational complexity level based on a property of the message. An encryption rule specifies a computation to be made on a portion of a message to generate an encoded message. For example, a message byte and a corresponding mask value might be compared and an even or odd parity bit generated from the comparison. Thus, when implementing a mask-value-based encryption rule, the rule specifies the mask value or source of the mask value, the message portion to be encoded using each mask value (e.g. a byte or a word), and the computation to be made using the mask value and message portion.

Some non-limiting examples of message properties used in encryption rule selection are a length, timestamp, type, sender and receiver of a message, a message's place within a message sequence, and properties of one or more previous messages in a message sequence. One implementation of module 340 selects one or more message properties used in encryption rule selection based on the message's computational complexity level. For example, the message's computational complexity level might be used to select how many previous messages in a message sequence, and which previous message or portion of a previous message should be used to encode the current message. In another example encryption rule, the first byte of the last three textual words in the immediate previous message would be used. In other examples, the message's computational complexity level might be used to select how many and which message properties would be used, how varying message lengths are accommodated (e.g. by repeating a portion of a message or with pseudorandom data), and whether or not pseudorandom data or a data salt would be used for message encoding.

Encryption module 350 uses a selected encryption rule to encode the message. Application 300 sends, or causes to be sent, a message encoded according to an encryption rule, and the confidentiality level of the encoded message, to a receiver.

At the receiving system, within another instance of application 300 already in possession of any previous message in a message sequence from the sender, decryption module 370 selects a decryption rule for the encoded message according to the received confidentiality level and decodes the received message according to the decryption rule. Decryption rule module 360 receives and maintains the mapping table between confidentiality level and corresponding computational complexity level, the set of encryption rules, one or more algorithms used to select an encryption rule, a salt used to generate pseudorandom data if used in a particular encryption rule, a genesis key or algorithm used to generate a genesis key, and other data used in message encoding and decoding.

Figure 4:
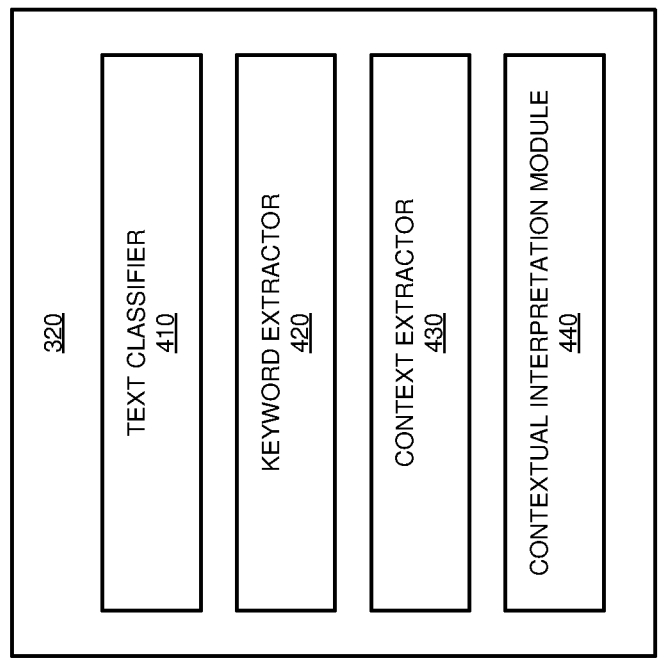
FIG. 4 depicts a block diagram of an example configuration for context based secure communication in accordance with an illustrative embodiment.

With reference to FIG. 4, this figure depicts a block diagram of an example configuration for context based secure communication in accordance with an illustrative embodiment. In particular, FIG. 4 depicts more detail of confidentiality module 320 in FIG. 3.

In particular, confidentiality module 320 uses one or more of text classifier 410, keyword extractor 420, context extractor 430, and contextual interpretation module 440 to identify keywords and concepts contained in textual content of a message, or non-textual content of a message converted to text form. Text classifier 410 assigns tags or categories to a portion of text according to the portion's content. Keyword extractor 420 extracts the most used and most important words and expressions from a portion of text. Concept extractor 430 generalizes keyword extraction to determine, not just particular words, but concepts expressed in a portion of text. Contextual interpretation module 440 analyzes the words around a keyword (i.e. the context of a keyword) to refine and confirm the results of keyword and concept extraction techniques. Some implementations of modules 410, 420, 430, and 440 use one or more trained natural language processing models to perform each technique.

Figure 5:
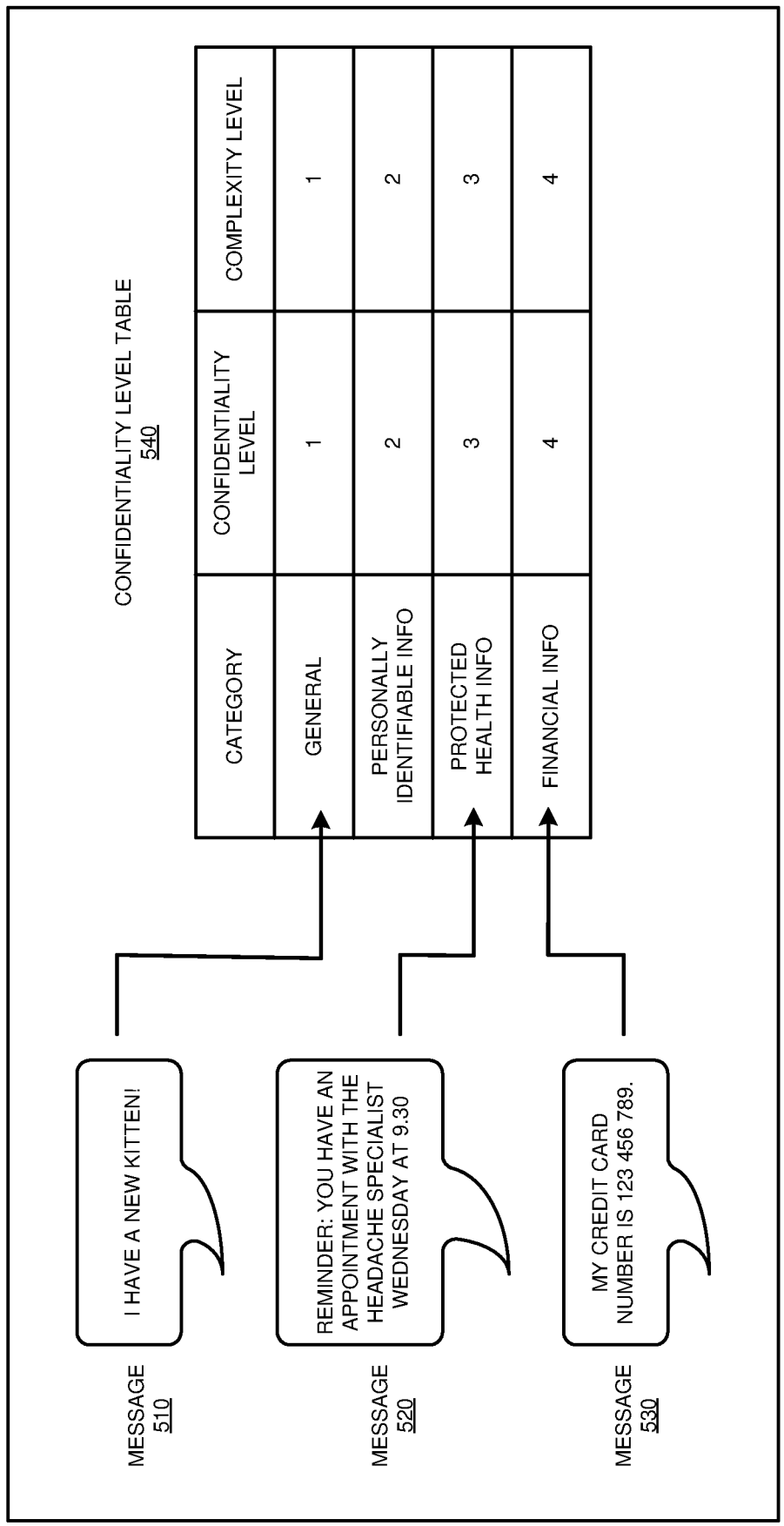
FIG. 5 depicts an example of context based secure communication in accordance with an illustrative embodiment.

With reference to FIG. 5, this figure depicts an example of context based secure communication in accordance with an illustrative embodiment. The example can be executed using application 300 in FIG. 3.

As depicted, application 300 analyzes message 510 and categorizes message 510 into the general category, with a confidentiality level of 1 (the lowest) and a corresponding computational complexity level of 1 (also the lowest). Application 300 analyzes message 520. Because message 520 includes details of a person's medical complaint and appointment information, which is protected health information in the applicable jurisdiction, application 300 categorizes message 520 into the protected health information category, with a confidentiality level of 3 and a corresponding computational complexity level of 3. Application 300 also analyzes message 530. Because message 530 includes a credit card number, which is protected financial information, application 300 categorizes message 530 into the financial information category, with a confidentiality level of 4 (the highest) and a corresponding computational complexity level of 4 (also the highest). Note that confidentiality level table 540 also includes a personally identifiable information category with a confidentiality level of 2 and a corresponding computational complexity level of 2.

Figure 6:
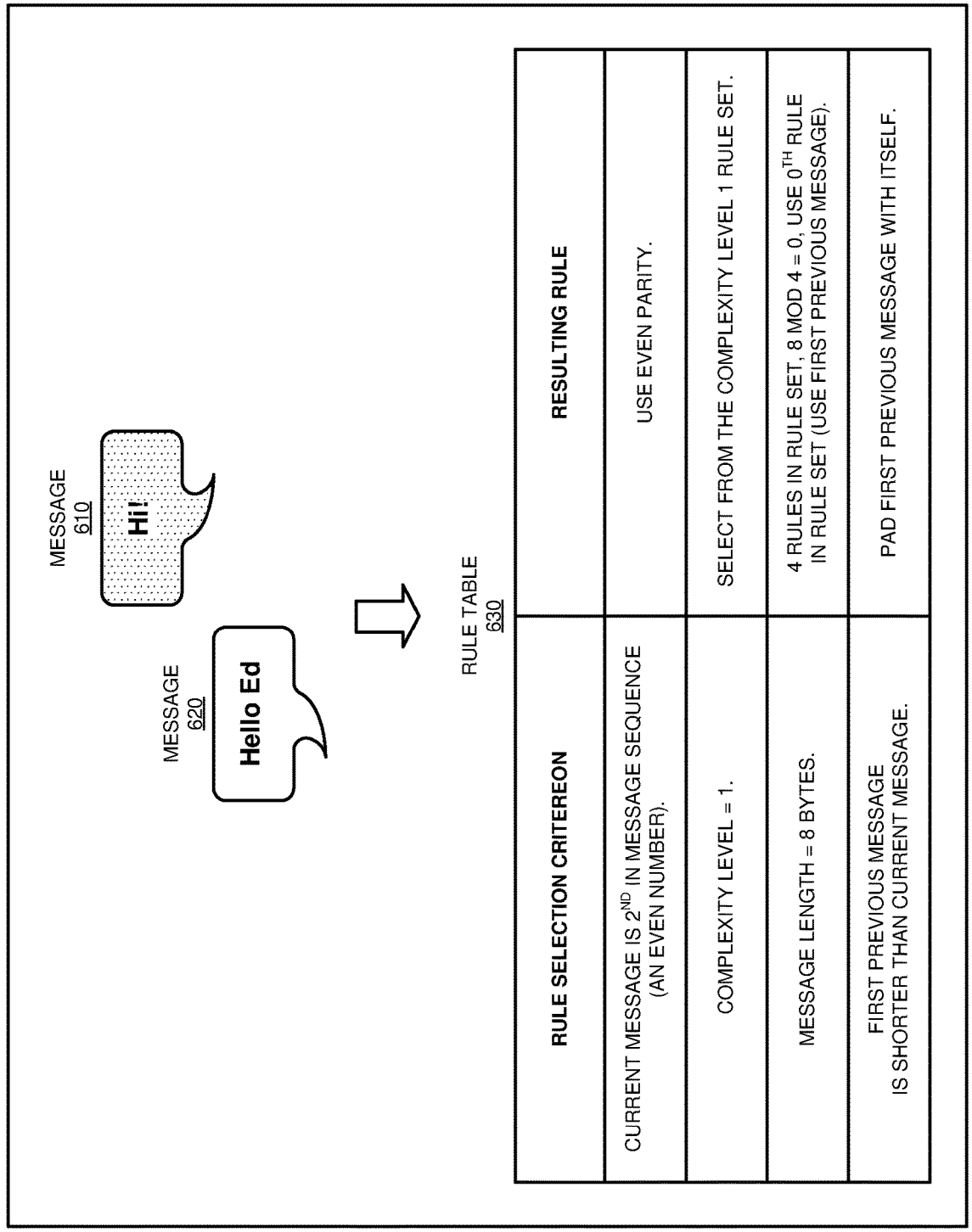
FIG. 6 depicts an example of context based secure communication in accordance with an illustrative embodiment.

With reference to FIG. 6, this figure depicts an example of context based secure communication in accordance with an illustrative embodiment. The example can be executed using application 300 in FIG. 3.

Here, message 620 is to be encrypted. Message 610 is the previous message to message 620 in a message sequence between the same two parties. Application 300 analyzes message 620 and its message sequence and, according to the results, uses the example rule selection criteria in rule table 630 to select a set of encryption rules for message 620. In particular, because message 620 is the second message in the message sequence, and thus an even number, application 300 encodes message 620 using even parity. Because message 620 was categorized to a computation complexity level of 1 (the lowest), the encryption rule will be selected from the rule set applicable to a computation complexity level of 1. Because message 620 is 8 bytes long, and there are 4 rules in the applicable rule set, application 300 selects the result of 8 mod 4, i.e. the $0^{th}$ rule in the rule set. Because message 610, the previous message in the sequence, is shorter than message 620, some padding is required. Thus application 300 pads message 610 with itself to generate a padded message with the same length as message 620. Note that the same rule selection criteria applied to a different message would result in different encryption rule selections. Different rule selection criteria applied to message 620 would also result in different encryption rule selections. However, both sender and receiver follow the same rule selection criteria and thus select the same rules for both encoding and decoding.

Figure 7:
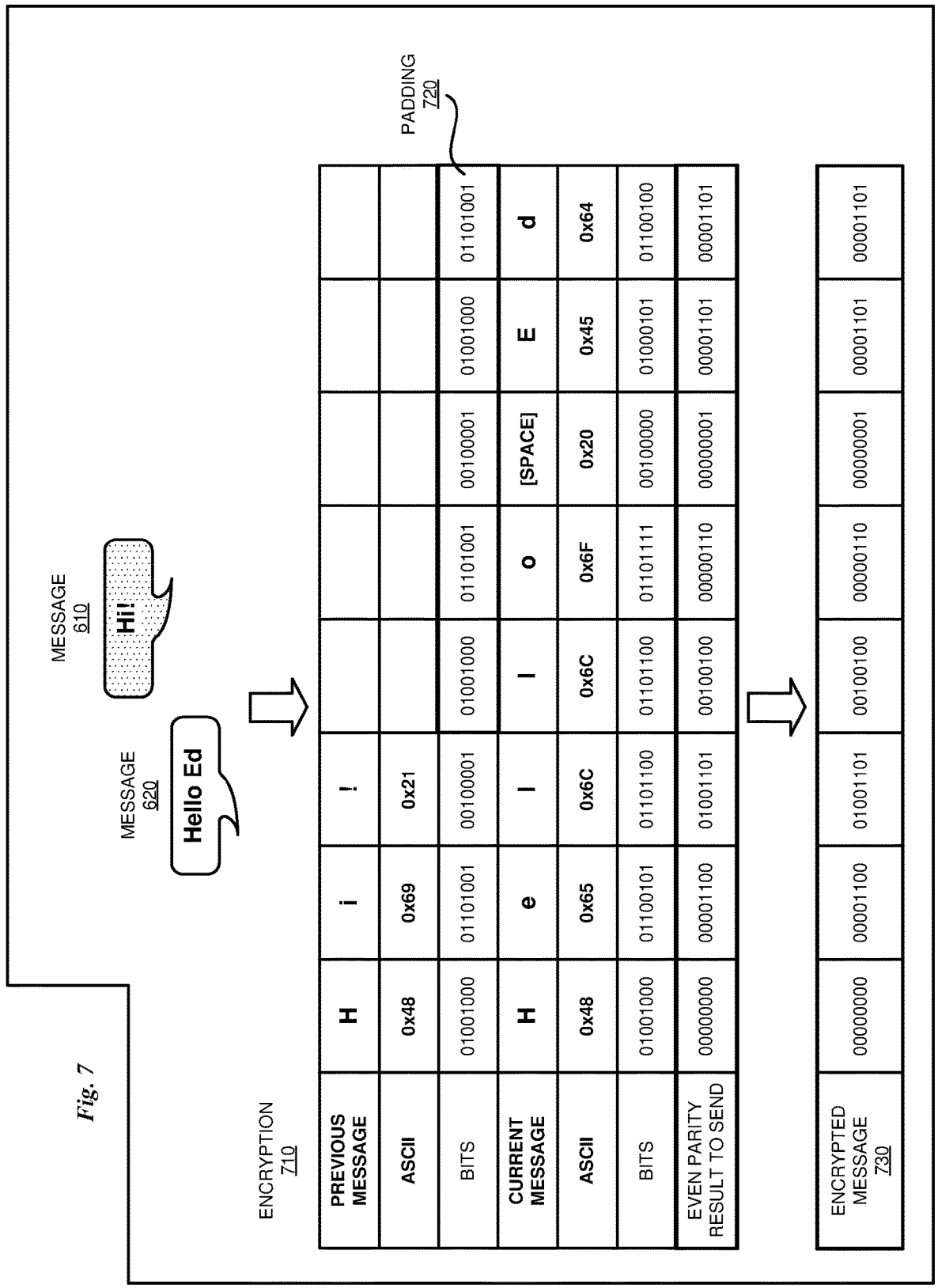
FIG. 7 depicts a continued example of context based secure communication in accordance with an illustrative embodiment.

With reference to FIG. 7, this figure depicts a continued example of context based secure communication in accordance with an illustrative embodiment. Messages 610 and 620 are the same as messages 610 and 620 in FIG. 6.

Encryption 710 illustrates the application of the encryption rules depicted in rule table 630. Thus, each character in message 610 (the previous message in the sequence) is converted to its American Standard Code for Information Interchange (ASCII) equivalent in hexadecimal, and the hexadecimal converted to binary for illustration purposes. Because message 610 is shorter than message 620, some padding is required. Thus application 300 pads message 610 with itself, repeating as necessary to generate a padded message with the same length as message 620. Padding 720 depicts the added bytes in binary form.

Each character in message 620 (the current message being encoded) is converted to its ASCII equivalent in hexadecimal, and the hexadecimal converted to binary for illustration purposes. Then, because even parity is being used, corresponding bits of the padded previous message and the current message are exclusive-ored together, generating encrypted message 730.

Figure 8:
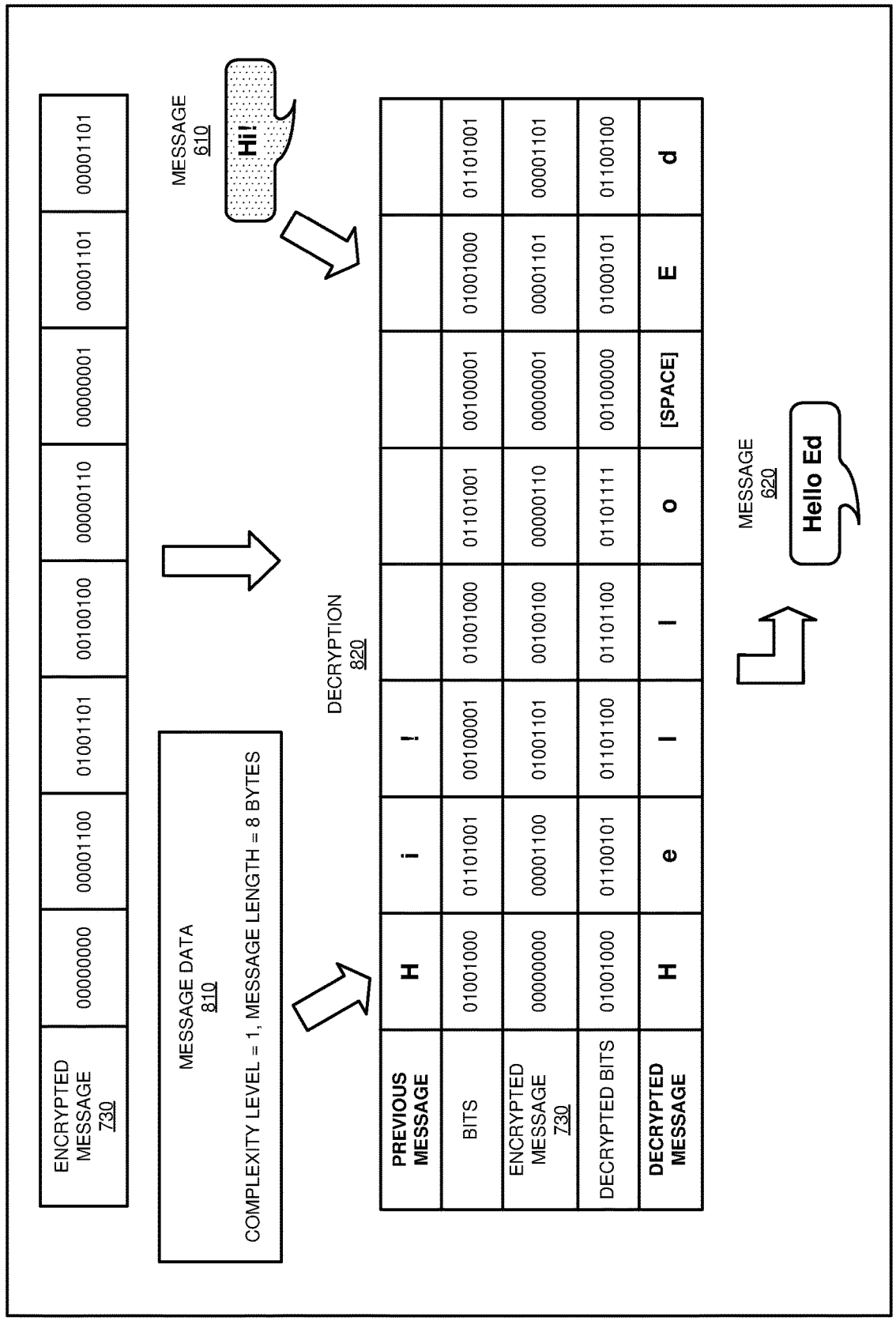
FIG. 8 depicts a continued example of context based secure communication in accordance with an illustrative embodiment.

With reference to FIG. 8, this figure depicts a continued example of context based secure communication in accordance with an illustrative embodiment. Messages 610 and 620 and encrypted message 730 are the same as messages 610 and 620 and encrypted message 730 in FIG. 7.

A receiver instance of application 300 had previously sent message 610 to the sender of message 620. Thus, the receiver instance already has message 610. The receiver instance receives encrypted message 730 and message data 810, and uses message 610 and message data 810 to apply the same rules as were used during encryption to decrypt encrypted message 730. The rule application is depicted in decryption 820. The result is message 620, now decrypted.

Figure 9:
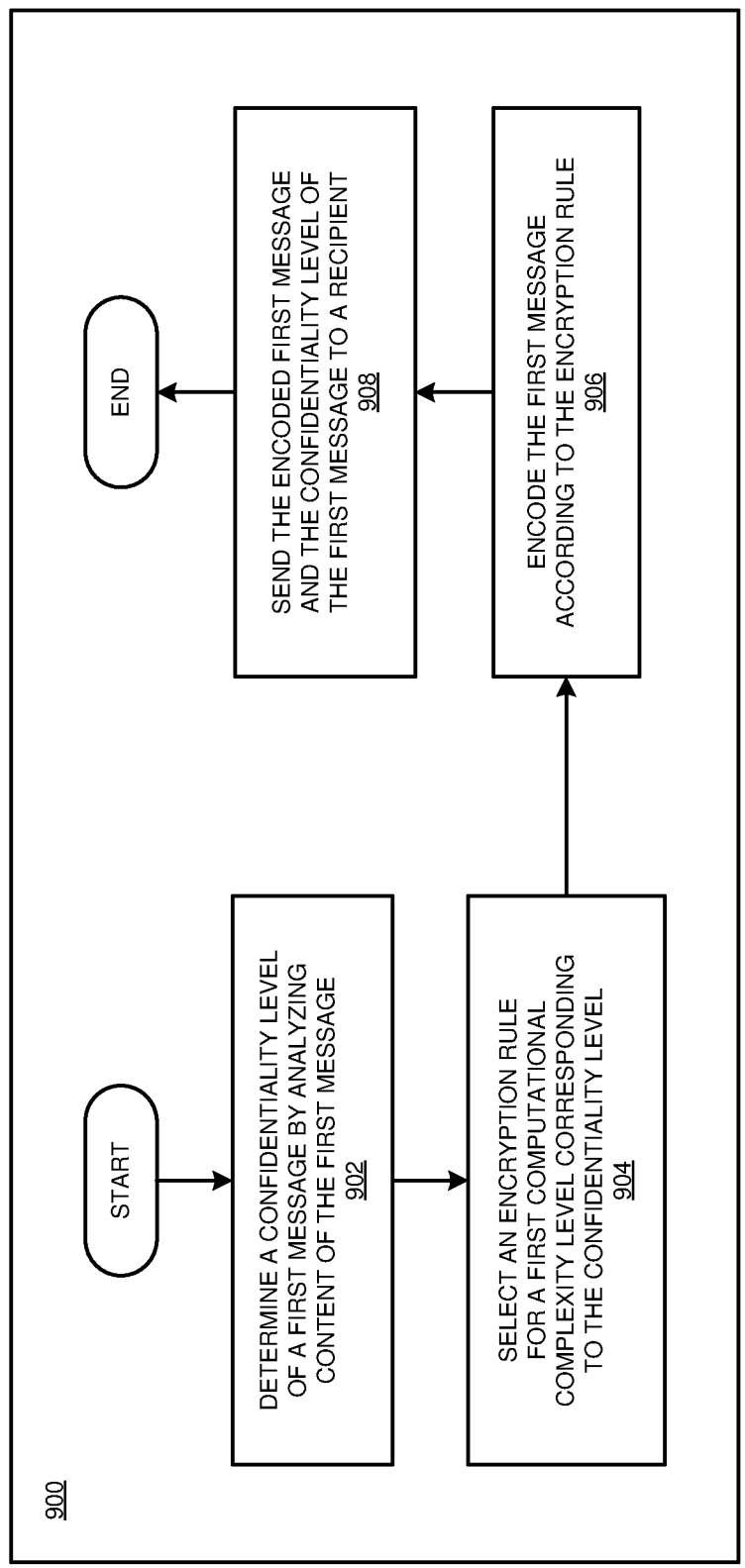
FIG. 9 depicts a flowchart of an example process for context based secure communication in accordance with an illustrative embodiment.

With reference to FIG. 9, this figure depicts a flowchart of an example process for context based secure communication in accordance with an illustrative embodiment. Process 900 can be implemented in application 300 in FIG. 3.

In block 902, the application determines a confidentiality level of a first message by analyzing content of the first message. In block 904, the application selects an encryption rule for a first computational complexity level corresponding to the confidentiality level. In block 906, the application encodes the first message according to the encryption rule. In block 908, the application sends the encoded first message and the confidentiality level of the first message to a recipient. Then the application ends.

Figure 10:
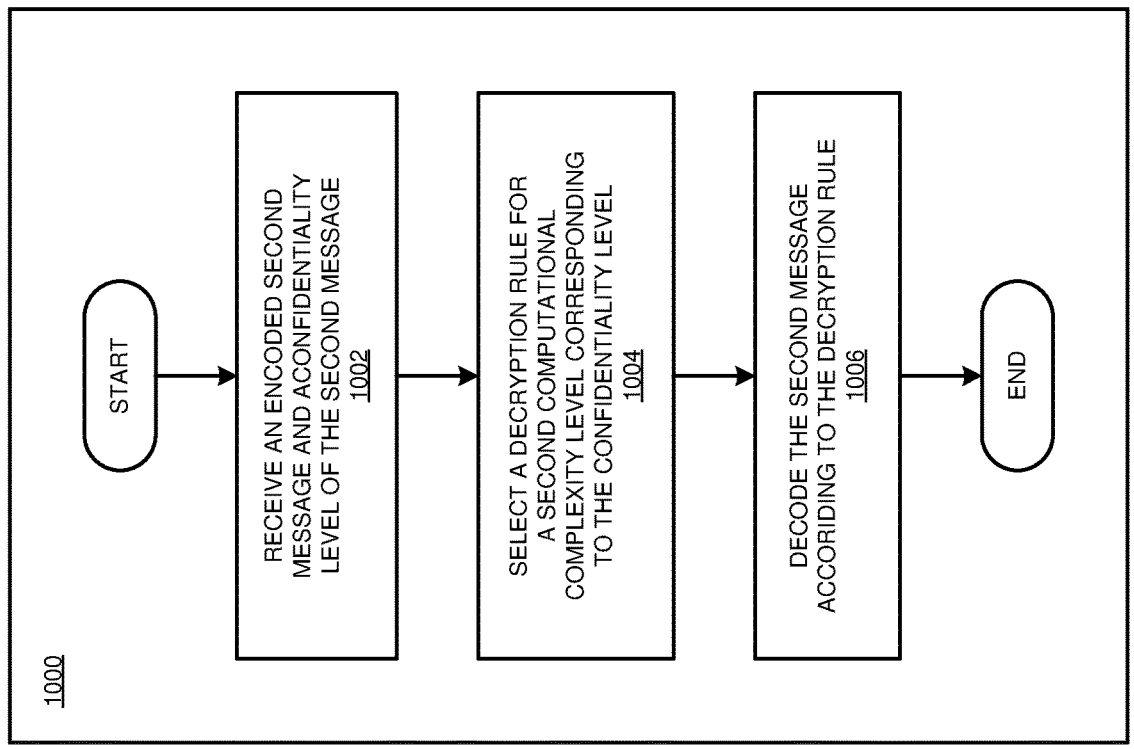
FIG. 10 depicts a flowchart of an example process for context based secure communication in accordance with an illustrative embodiment.

With reference to FIG. 10, this figure depicts a flowchart of an example process for context based secure communication in accordance with an illustrative embodiment. Process 1000 can be implemented in application 300 in FIG. 3.

In block 1002, the application receives an encoded second message and a confidentiality level of the second message. In block 1004, the application selects a decryption rule for a second computational complexity level corresponding to the confidentiality level. In block 1006, the application decodes the second message according to the decryption rule. Then the application ends.

Figure 11:
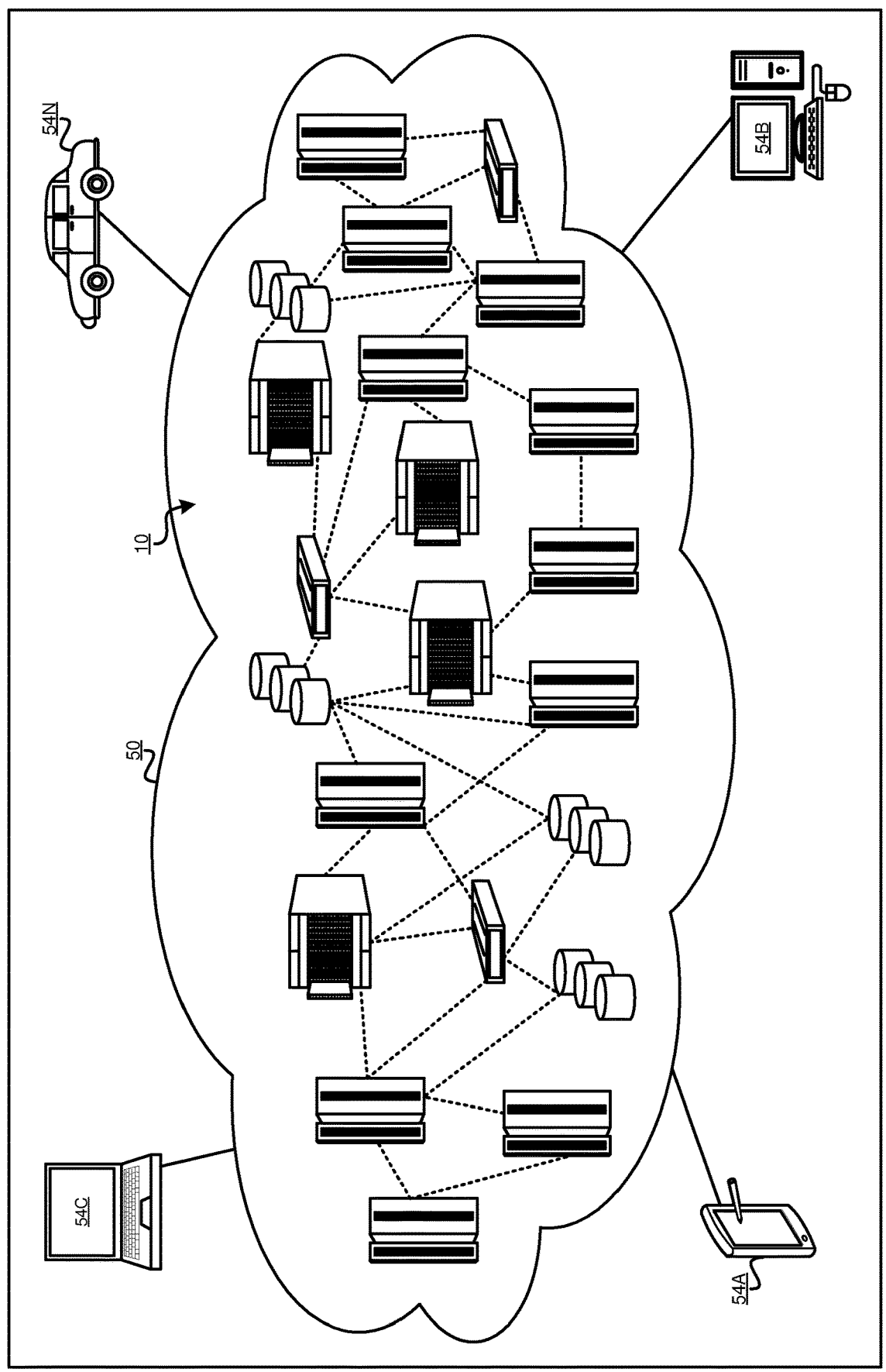
FIG. 11 depicts a cloud computing environment according to an embodiment of the present invention.

Referring now to FIG. 11, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N depicted are intended to be illustrative only and that computing nodes 10 and cloud computing environment 50 can communicate with any type of computerized device over any type of network and/or network addressable connection (e.g., using a web browser).

Figure 12:
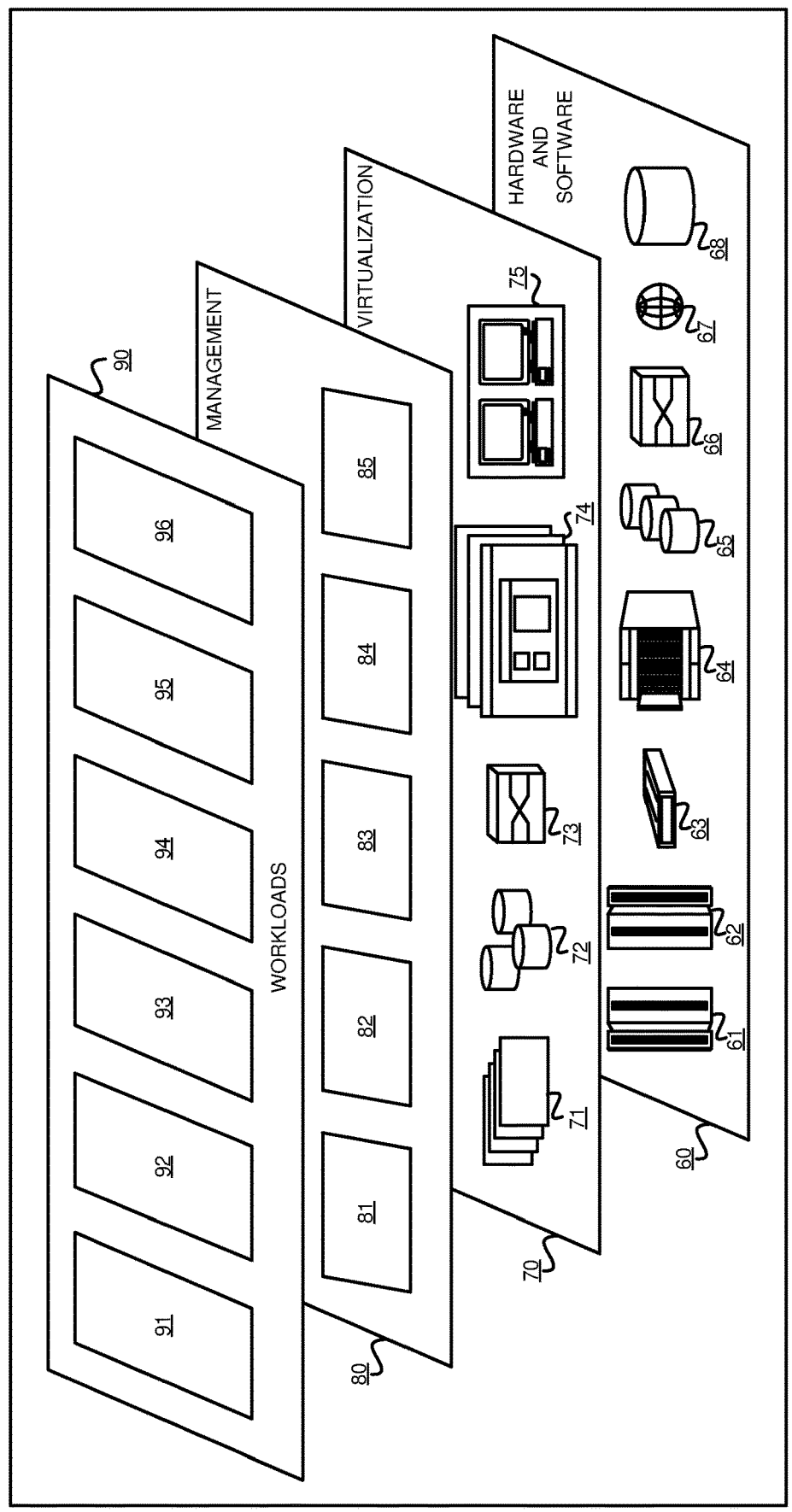
FIG. 12 depicts abstraction model layers according to an embodiment of the present invention.

Referring now to FIG. 12, a set of functional abstraction layers provided by cloud computing environment 50 (FIG. 11) is shown. It should be understood in advance that the components, layers, and functions depicted are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application selection based on cumulative vulnerability risk assessment 96.

Thus, a computer implemented method, system or apparatus, and computer program product are provided in the illustrative embodiments for context based secure communication and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
categorizing, into a category in a set of categories by analyzing a content of a first message, the first message;
selecting, according to the category, a confidentiality level of the first message;
selecting, for a first computational complexity level selected according to the confidentiality level of the first message, an encryption rule of the first computational complexity level;
encoding, according to the encryption rule, the first message, the encoding generating an encoded first message;
causing sending, to a recipient, the encoded first message and the confidentiality level of the first message;
causing receiving, from the recipient, an encoded second message and a confidentiality level of the encoded second message;
selecting, for a second computational complexity level corresponding to the confidentiality level of the encoded second message, a decryption rule; and
decoding, according to the decryption rule, the encoded second message.

2. The computer-implemented method of claim 1, wherein
categorizing, into the category in the set of categories, the content of the first message is performed using a natural language processing model on textual content of the first message.

3. The computer-implemented method of claim 1, wherein the encryption rule is selected based on a property of the first message.

4. The computer-implemented method of claim 1, wherein the encryption rule is selected based on a property of a message sequence, the message sequence comprising a set of messages, each message in the set of messages having the same sender and receiver as the first message.

5. The computer-implemented method of claim 4, wherein the first message is a most recent message in the message sequence.

6. The computer-implemented method of claim 1, wherein the encryption rule encodes the first message using a content of a previous message, the previous message having the same sender and receiver as the first message.

7. The computer-implemented method of claim 1, wherein the encryption rule encodes the first message using a property of a previous message between the same sender and receiver as the first message.

8. A computer program product for context based encoded communication, the computer program product comprising: one or more computer readable storage media, and program instructions collectively stored
on the one or more computer readable storage media, the program instructions comprising:
program instructions to categorize, into a category in a set of categories, by analyzing a content of a first message, the first message;
program instructions to select, according to the category, a confidentiality level of the first message;
program instructions to select, for a first computational complexity level selected according corresponding to the confidentiality level of the first message, an encryption rule of the first computational complexity level;
program instructions to encode, according to the encryption rule, the first message, the encoding generating an encoded first message;
program instructions to cause sending, to a recipient, the encoded first message and the confidentiality level of the first message;
program instructions to cause receiving, from the recipient, an encoded second message and a confidentiality level of the encoded second message;
program instructions to select, for a second computational complexity level corresponding to the confidentiality level of the encoded second message, a decryption rule; and
program instructions to decode, according to the decryption rule, the encoded second message.

9. The computer program product of claim 8, wherein program instructions to categorize, into the category in the set of categories, the content of the first message is performed using a natural language processing model on textual content of the first message.

10. The computer program product of claim 8, wherein the encryption rule is selected based on a property of the first message.

11. The computer program product of claim 8, wherein the encryption rule is selected based on a property of a message sequence, the message sequence comprising a set of messages, each message in the set of messages having the same sender and receiver as the first message.

12. The computer program product of claim 11, wherein the first message is a most recent message in the message sequence.

13. The computer program product of claim 8, wherein the encryption rule encodes the first message using a content of a previous message, the previous message having the same sender and receiver as the first message.

14. The computer program product of claim 8, wherein the encryption rule encodes the first message using a property of a previous message between the same sender and receiver as the first message.

15. The computer program product of claim 8, wherein the stored program instructions are stored in the at least one of the one or more storage media of a local data processing system, and wherein the stored program instructions are transferred over a network from a remote data processing system.

16. The computer program product of claim 8, wherein the stored program instructions are stored in the at least one of the one or more storage media of a server data processing system, and wherein the stored program instructions are downloaded over a network to a remote data processing system for use in a computer readable storage device associated with the remote data processing system.

17. The computer program product of claim 8, wherein the computer program product is provided as a service in a cloud environment.

18. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
program instructions to categorize, into a category in a set of categories, by analyzing a content of a first message, the first message;
program instructions to select, according to the category, a confidentiality level of the first message;
program instructions to select, for a first computational complexity level selected according corresponding to the confidentiality level of the first message, an encryption rule of the first computational complexity level;

program instructions to encode, according to the encryption rule, the first message, the encoding generating an encoded first message;

program instructions to cause sending, to a recipient, the encoded first message and the confidentiality level of the first message;

program instructions to cause receiving, from the recipient, an encoded second message and a confidentiality level of the encoded second message;

program instructions to cause select, for a second computational complexity level corresponding to the confidentiality level of the encoded second message, a decryption rule; and program instructions to decode, according to the decryption rule, the encoded second message.

\* \* \* \* \*